(12) United States Patent
Vangala et al.

(10) Patent No.: US 11,985,652 B2
(45) Date of Patent: May 14, 2024

(54) P-BSR ENHANCEMENTS FOR IAB NETWORKS TO IMPROVE E2E LATENCY

(71) Applicant: APPLE INC., Cupertino, CA (US)

(72) Inventors: Sarma V. Vangala, Cupertino, CA (US); Fangli Xu, Beijing (CN); Haijing Hu, Cupertino, CA (US); Murali Narasimha, Cupertino, CA (US); Naveen Kumar R Palle Venkata, San Diego, CA (US); Ralf Rossbach, Bavaria-Bayern (DE); Sethuraman Gurumoorthy, Cupertino, CA (US); Sree Ram Kodali, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 205 days.

(21) Appl. No.: 17/593,680

(22) PCT Filed: Jan. 14, 2021

(86) PCT No.: PCT/CN2021/071679
§ 371 (c)(1),
(2) Date: Sep. 22, 2021

(87) PCT Pub. No.: WO2022/151129
PCT Pub. Date: Jul. 21, 2022

(65) Prior Publication Data
US 2023/0180212 A1 Jun. 8, 2023

(51) Int. Cl.
*H04W 72/1263* (2023.01)
*H04W 28/02* (2009.01)

(52) U.S. Cl.
CPC ... *H04W 72/1263* (2013.01); *H04W 28/0278* (2013.01)

(58) Field of Classification Search
None
See application file for complete search history.

(56) References Cited

U.S. PATENT DOCUMENTS

| 2007/0201369 A1 | 8/2007 | Pedersen |
| 2014/0126363 A1 | 5/2014 | Zeng et al. |
| 2021/0400526 A1* | 12/2021 | Wu ........................ H04W 72/21 |

FOREIGN PATENT DOCUMENTS

WO     2019191961 A1     10/2019

OTHER PUBLICATIONS

PCT/CN2021/071679, International Search Report and Written Opinion, dated Oct. 18, 2021, 9 pages.

(Continued)

*Primary Examiner* — Kouroush Mohebbi
(74) *Attorney, Agent, or Firm* — Dorsey & Whitney LLP

(57) ABSTRACT

Systems and methods for enhancing the use of pre-emptive buffer status reports (pre-BSRs) in wireless communications systems implementing integrated access and backhaul (IAB) networks are disclosed herein. In some cases, an IAB node can re-classify the LCGs of one or more incoming data flows according to such pre-BSR usage. This may involve the use of and extended medium access control (MAC) control element (MAC CE) having more LCG bits than previously contemplated, having sub-LCG bits, or that includes further LCG classification information bits. Other embodiments use a priority index for LCGs in an extended pre-BSR MAC CE. The priority index may include one or more of a priority field, a prioritized bit rate (PBR), and/or a bucket size duration (BSD) that is reported to an IAB donor. Other embodiments leverage the provision of additional grants from an IAB node to a child IAB node to reduce unwanted pre-BSR effects.

16 Claims, 13 Drawing Sheets

(56) References Cited

OTHER PUBLICATIONS

Samsung (Rapporteur), "Report on email discussion [106#46][IAB]: Low-latency scheduling", R2-1912572 (resubmission of R2-1910028), 3GPP TSG-RAN WG2 #107-bis, Chongqing, PRC, Agenda Item 6.1.4.1, Oct. 14-18, 2019, 52 pages.

\* cited by examiner

P-BSR ENHANCEMENTS FOR IAB NETWORKS TO IMPROVE E2E LATENCY

TECHNICAL FIELD

This application relates generally to wireless communication systems, including the use of pre-emptive buffer status reports (pre-BSRs) in wireless communications systems implementing integrated access and backhaul (IAB) networks.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A millimeter wave (mmwave) deployment of a wireless network may use fiber backhaul in order to carry traffic at NR speeds. It may be difficult or expensive, however, to provide fiber backhaul for the many nodes used for mmwave coverage. In certain systems, integrated access and backhaul (IAB) may be used to overcome deployment costs of ultra-dense NR mmWave networks by realizing wireless backhaul links to relay the access traffic.

IAB architectures enable multi-hop routing wherein IAB nodes serve as both access nodes to UEs and provide backhaul (BH) links to other IAB nodes. On the wireless backhaul, the IP layer is carried over the backhaul adaptation protocol (BAP) sublayer, which enables routing over multiple hops. The BAP allows for the IAB nodes to talk to each other and provides for a number of functionalities which include, for example, mapping of next hop radio link control (RLC) channels, routing to next hop IAB nodes (both child and parent) based on traffic differentiation, indication of network events (e.g., radio link failure (RLF)), data transfer, and/or flow control feedback signaling.

On each backhaul link, the BAP protocol data units (PDUs) are carried by BH RLC channels. Multiple BH RLC channels can be configured on each BH link to allow traffic prioritization and quality of service (QoS) enforcement. The BH-RLC-channel mapping for BAP PDUs is performed by the BAP entities on each IAB node and the IAB donor data unit (DU). In certain systems, RLC channel mapping may be done through a radio resource control (RRC) reconfiguration message from the donor control unit (CU) to each of the individual nodes. In some implementations of BH RLC channel establishment, separate RRC reconfiguration messages are used to ensure that the setup is done hop by hop until the final destination (at the UE).

Figure 1:
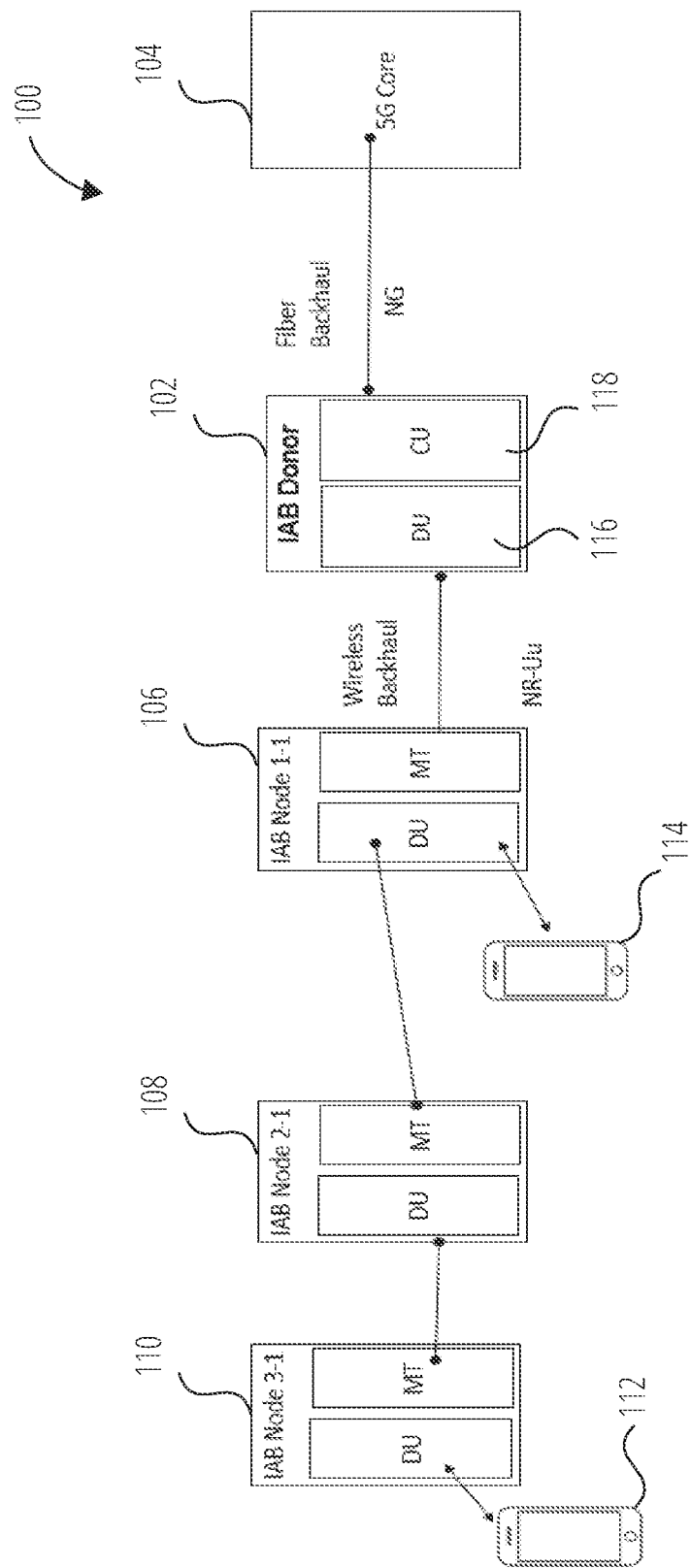
FIG. 1 illustrates an example integrated access and backhaul (IAB) network for certain embodiments.

FIG. 1 illustrates an example IAB network 100 for certain embodiments. The IAB network 100 includes an IAB donor 102 with a fiber backhaul connection (e.g., through an NG interface) to a 5G core network (5GC) 104. In this example, the IAB network 100 also an IAB node 106 (shown as IAB Node 1-1), an IAB node 108 (shown as IAB Node 2-1), and an IAB node 110 (shown as IAB Node 3-1), although any number of IAB nodes or hops may be used to establish a connection between a UE 112 and the 5GC 104. The IAB node 110 establishes communication between the UE 112 and the 5GC 104 using a wireless backhaul (e.g., using an NR-Uu interface). Skilled persons will recognize from the disclosure herein that any of the IAB nodes may also provide communication other UEs. For example, the IAB node 106 may establish communication between a UE 114 and the 5GC 104. It is contemplated that an IAB donor may also be properly considered, in at least some situations, as an IAB node as that term is used herein (e.g., in the context of its relationship to its direct child IAB nodes).

The IAB donor 102, which may also be referred to as a backend node, comprises a DU 116 and a CU 118. Although shown as a single unit, the DU 116 of the IAB donor 102 may comprise two or more DUs. The IAB node 106, IAB node 108, and IAB node 110 may be referred to as intermediate nodes, child nodes or relay nodes and each includes two sub-components: a DU and a mobile terminal (MT). A CU typically provides for the basic control plane functionality. In certain embodiments, a CU includes CU-control plane (CU-CP), CU-user plane (CU-UP), and/or other functionality.

An MT comprises components that configure a network node (e.g., gNB) to behave similar to a regular UE. For example, protocols that typical UEs use to connect to the network are supported in the MT with additional enhancements discussed in 3GPP Rel. 16 and Rel. 17. For example, an MT in the IAB node 108 allows the IAB node 108 to establish signaling radio bearers (SRBs) and/or data radio bearers (DRBs) with its parent node (the IAB node 106). An MT performs cell selection to identify which parent to join and sets up and utilizes RLC through the BAP layer that provides functionality for routing data for different UE bearers over different routes through the network.

Figure 2:
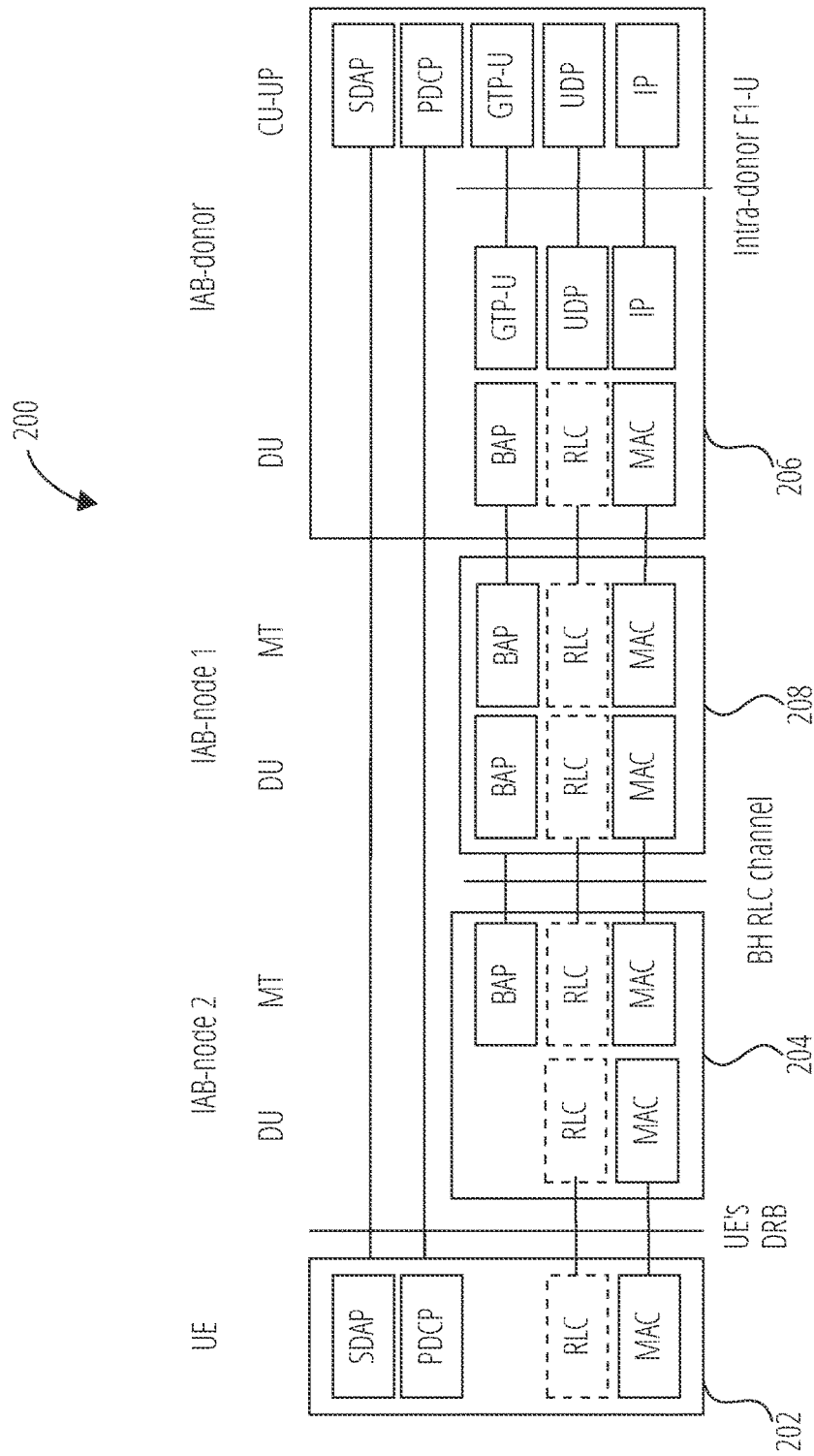
FIG. 2 illustrates an example protocol architecture for IAB in accordance with one embodiment.

FIG. 2 illustrates an example protocol architecture for IAB 200 according to one embodiment. The example protocol architecture for IAB 200 shows various protocol layers for a UE 202, a first IAB node 208 (IAB-node 1), a second IAB node 204 (IAB-node 2), and an IAB donor 206. The various layers may correspond to mobile terminated (MT), distributed unit (DU), or centralized unit (CU)-user plane (UP) entities. The DU and CU-UP of the IAB donor 206 may communicate through an intra-donor F1-U interface. In this example, the UE 202 wirelessly communicates with the second IAB node 204 through the UE's dedicated radio bearer (DRB), and the second IAB node 204 wirelessly relays the uplink traffic to the first IAB node 208 through a backhaul (BH) radio link control (RLC) channel. The protocol layers include, for example, medium access control (MAC), RLC, packet data convergence protocol (PDCP), service data adaptation protocol (SDAP), internet protocol (IP), user datagram protocol (UDP), and general packet radio service (CPRS) tunneling protocol user plane (GTP-U).

The example protocol architecture for IAB 200 also includes a backhaul adaptation protocol (BAP) layer that provides functionality for routing data for different UE bearers over different routes through the network. This may be done by having an adaptation layer header that includes some information to identify a bearer. The routing includes mapping incoming data to an outgoing link based on the bearer identifier.

Given that different UE bearers can be carried on different routes through the network, in certain embodiments, the buffer occupancy status generated by a node may be relevant only to bearers that are routed through that node and the IAB nodes on those routes.

Embodiments herein contemplate the use of buffer status reports (BSRs) and pre-emptive BSRs (pre-BSRs). A BSR allows a sending entity to indicate to a receiving entity the size of a data buffer that is desired to be sent by the sending entity to the receiving entity. This data buffer may comprise one or more PDUs, with a corresponding size for the one or more PDUs being sent. This allows the receiving entity to provide an appropriate UL grant of resources that may be used by the sending entity to send the data in the data buffer to the receiving entity. The UL grant may be appropriate in that it may be sized to roughly correspond to the amount of data to be so sent. A BSR may be used between UEs and IAB nodes and/or as between IAB nodes, in the manner illustrated. A sending entity may be limited in how frequently it is allowed (e.g., by pre-configuration) to send a BSR to a receiving entity. For example, once a sending entity sends a first BSR to a receiving entity, it may start a timer that allows for the sending of a second BSR (corresponding to other UL data) only upon its expiration. A BSR (as opposed to, e.g., a pre-BSR) may be sometimes referred to herein as a "regular BSR."

In IAB embodiments, a pre-BSR may be used in place of one or more BSR between a pair of IAB nodes. The pre-BSR be sent by a sending IAB node to a receiving IAB node in order to provide the receiving IAB node with information regarding an amount of data that the sending IAB node expects to receive from an IAB node and/or a UE that is a child of the sending IAB node. This information may be known at the sending IAB node due to a BSR (or pre-BSR) that has been previously received at the sending IAB node. The pre-BSR may accordingly be triggered by such receipt of this BSR (or pre-BSR) at the sending IAB node. In some embodiments, the pre-BSR sent by the sending node is instead triggered by the sending IAB node of a UL grant corresponding to such a BSR (or pre-BSR) that has been received at the sending IAB node.

It in contemplated that solutions described herein may add additional utility to, for example, the use of pre-BSRs, in an IAB context, in the manner that will be described below.

Figure 3:
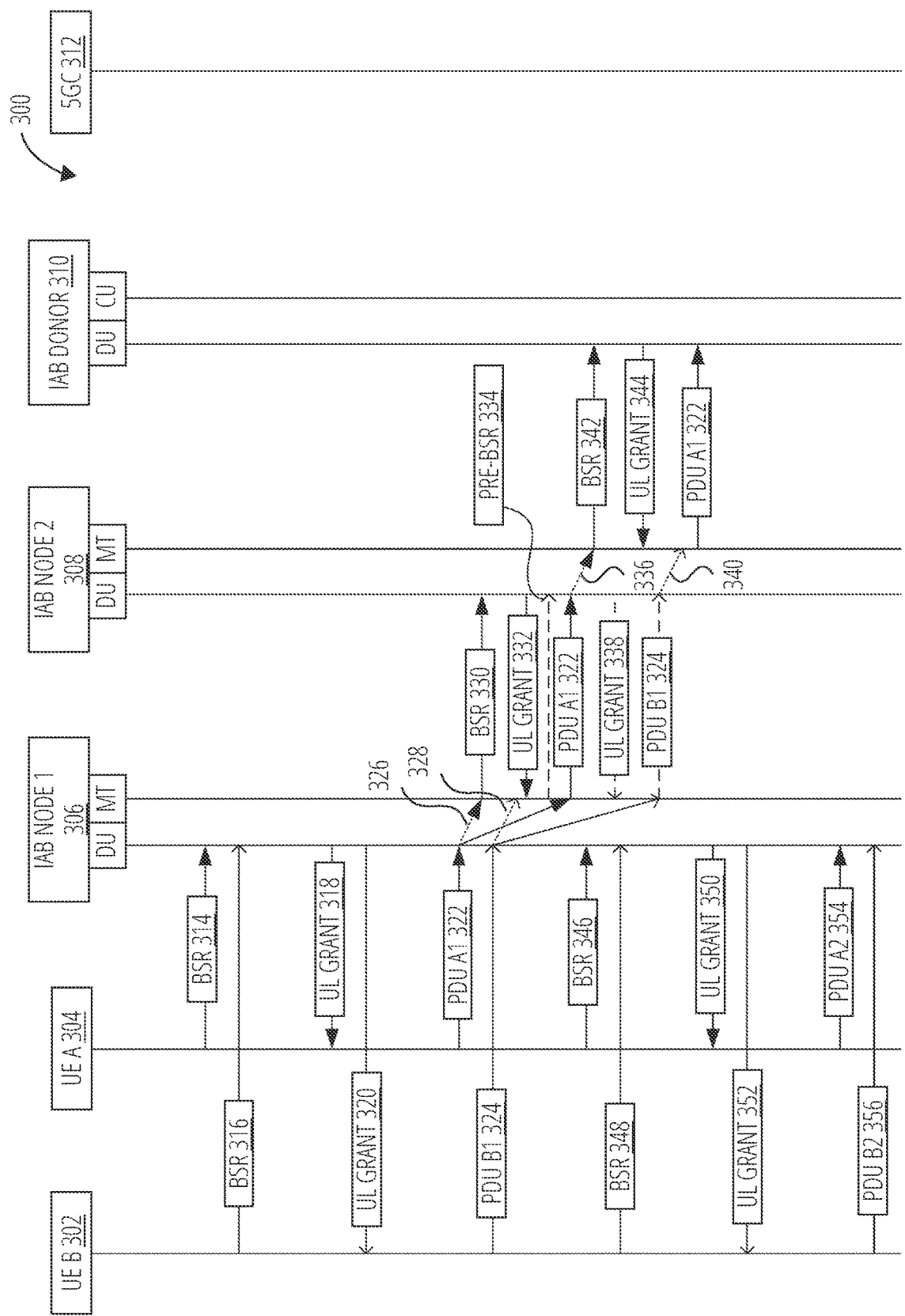
FIG. 3 illustrates a signaling flow for an IAB network using a pre-emptive buffer status report (pre-BSR), according to an embodiment.

FIG. 3 illustrates a signaling flow 300 for an IAB network using a pre-emptive buffer status report (pre-BSR) 334, according to an embodiment.

The IAB network implementing signaling flow 300 includes a UE B 302, a UE A 304, an IAB node 1 306, an IAB node 2 308, an IAB donor 310, and the 5GC 312. The IAB node 1 306 and the IAB node 2 308 may be relay IAB nodes within the IAB network from the perspective of the UE B 302 and the UE A 304, in the manner illustrated. Accordingly, each may include a protocol stack that includes DU and an MT, as illustrated. The IAB donor 310 may be a donor node for the IAB network. Accordingly, the IAB donor 310 may include a protocol stack that includes a DU and a CU, as illustrated. It is contemplated that either of the UE B 302 and/or the UE A 304 could each respectively represent a group of UEs.

The signaling flow 300 proceeds as illustrated, with the UE A 304 sending the BSR 314 and the UE B 302 sending the BSR 316 to the DU of the IAB node 1 306. In response to the BSR 311, the IAB node 1 306 sends a UL grant 318 to the UE A 304. In response to the BSR 316, the IAB node 1 306 sends a UL grant 320 to the UE B 302. Corresponding to the UL grant 318 received at the UE A 301, the UE A 304 sends the PDU A1 322 to the DU of the IAB node 1 306. Corresponding to the UL grant 320 received at the UE B 302, the UE B 302 sends the PDU B1 324 to the DU of the IAB node 1 306. It is contemplated that the PDU A1 322 and/or the PDU B1 324 could each respectively represent a group of PDUs.

The DU of the IAB node 1 306 then performs the first IAB node PDU A1 transfer 326 to the MT of the IAB node 1 306. Because the IAB node 1 306 is a relay node between the UE A 304 and the IAB node 2 308, it should forward the PDU A1 322 to the IAB node 2 308. Accordingly, the MT of the IAB node 1 306 responds to the first IAB node PDU A1 transfer 326 by sending the BSR 330 to the DU of the IAB node 2 308 to request uplink resources for forwarding the PDU A1 322. The DU of the IAB node 2 308 responds to the BSR 330 with the UL grant 332, and the MT of the IAB node 1 306 can in response send the PDU A1 322 to the DU of the IAB node 2 308, as illustrated.

As illustrated, DU of the IAB node 1 306 also performs the first IAB node PDU B1 transfer 328 to the MT of the IAB node 1 306. However, at this time, the MT of the IAB node 1 306 may be prevented from immediately sending a (regular) BSR corresponding to the PDU B1 324 to the DU of the IAB node 2 308. This may be because a timer for the BSR 330 that was previously sent to the DU of the IAB node 2 308 by the MT of the IAB node 1 306 has not yet expired. Accordingly, instead of waiting for the timer to expire and then sending a (regular) BSR corresponding to the PDU B1 324, the MT of the IAB node 1 306 instead sends a pre-BSR 334 to the MT of the IAB node 2 308, because the pre-BSR 334 may not have the same timer restrictions as regular BSRs. As the BSR 316 has already been sent to the IAB node 1 306 (and, in some embodiments, because the IAB node 1 306 has responded with UL grant 320), the triggering conditions of the use of the pre-BSR 334 are met (and note that the IAB node 1 306 does not necessarily need to wait for the first IAB node PDU B1 transfer 328 to occur prior to sending the pre-BSR 334, as these prior triggering conditions may have already informed it of the need to request an UL grant from the IAB node 2 308 for the PDU B1 324). That the sending of the pre-BSR 334 occurs prior to the expiration of a BSR timer at the IAB node 1 306 corresponding to the BSR 330 may allow the DU of the IAB node 2 308 to send the UL grant 338 for the PDU B1 324 to the MT of the IAB node 1 306 faster than in the regular BSR case. A quicker receipt of the UL grant 338 for the PDU B1 324 at the MT of the IAB node 1 306 may then correspond to a quicker sending of the PDU B1 324 from the MT of the IAB node 1 306 to the DU of the IAB node 2 308. In this manner, the signaling flow 300 is improved over the "pure" regular BSR case.

As illustrated, the signaling flow 300 further continues with the DU of the IAB node 2 308 performing the second IAB node PDU A1 transfer 336 to the MT of the IAB node 2 308, with a corresponding BSR 342, UL grant 344, and sending of the PDU A1 322 between the MT of the IAB node 2 308 and the DU of the IAB donor 310. The DU of the IAB node 2 308 also performs the second PDU B1 transfer 340 to the MT of the IAB node 2 308. Here, the MT of the IAB node 2 308 could use a pre-BSR to request a UL grant for the PDU B1 324 in the case that a tinier for the BSR 342 has not yet expired (not illustrated), or it may proceed to use a (regular) BSR to request a TIE grand for the PDU B1 324 in the case that the timer for the BSR 342 has expired at this stage.

Meanwhile, the UE B 302, the UE A 304, and the IAB node 1 306 may perform the processes shown earlier in FIG. 3 for the new PDU A2 354 and the new PDU B2 356, as illustrated by the uses of the BSR 346 and the BSR 348, the respective responding UL grant 350 and UL grant 352, and the respective sending of the PDU A2 354 and the PDU B2 356.

Figure 4:
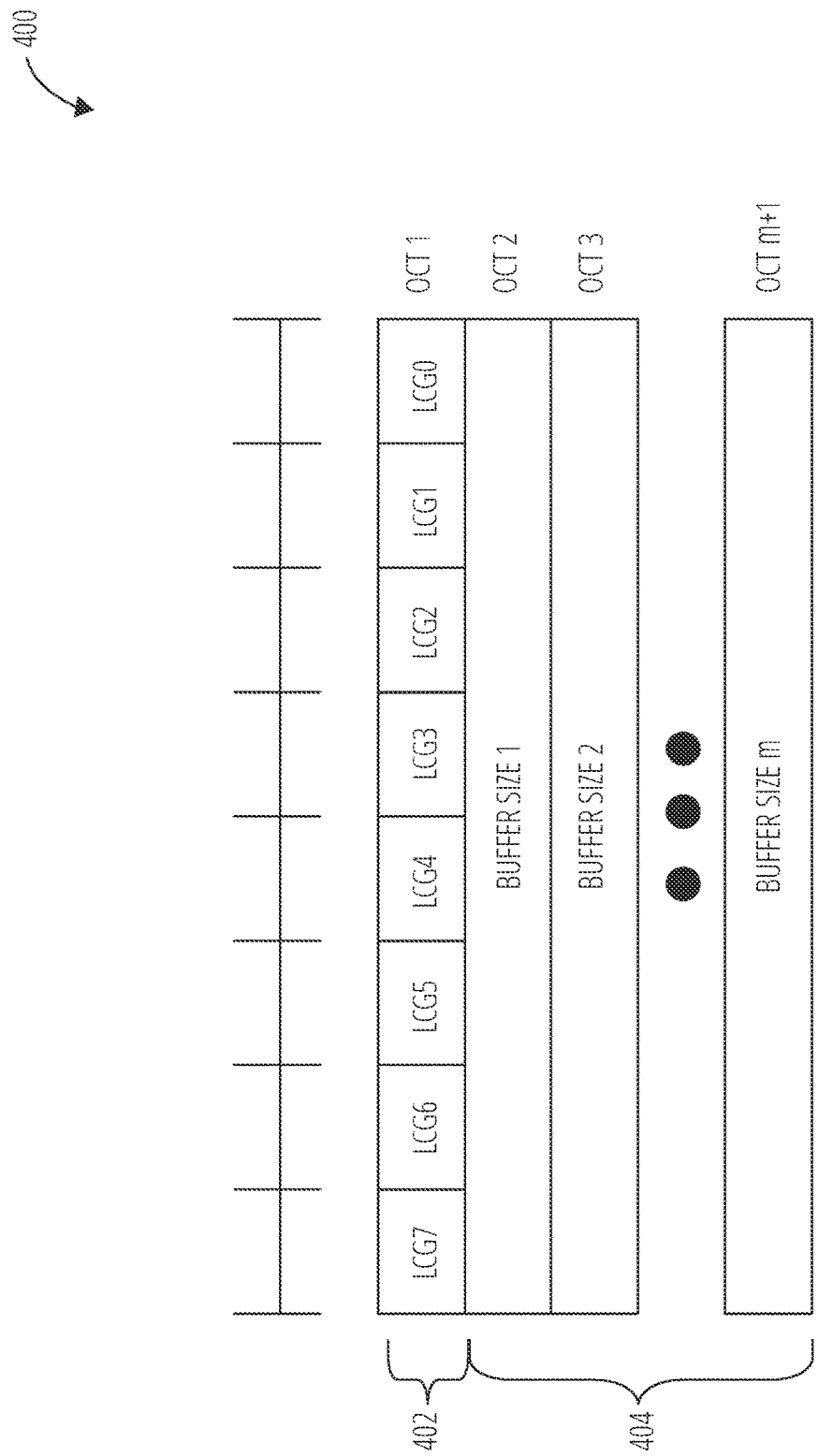
FIG. 4 illustrates a format for a medium access control (MAC) control element (MAC CE) for transmitting a pre-BSR, according to an embodiment.

FIG. 4 illustrates a format for a medium access control (MAC) control element (MAC CE) 400 for transmitting a pre-BSR, according to an embodiment. The MAC CE 400 includes the logical channel group (LCG) bits 402 and the buffer size bits 404. The LCG bits 402 may be used to represent a LCG corresponding to or for a data flow. A data flow may include one or more PDUs between a first and a second entity (e.g., as described in relation to FIG. 3) that correspond to each other over time (for example, one or more such PDUs that each correspond to a VoIP application of a UE, etc.) It is contemplated that an IAB node can, in some embodiments, combine multiple incoming data flows into one or more outgoing data flows, as will be described in further detail below.

The LCG to which a data flow is assigned may represent a priority for the treatment of the data flow. For instance, a data flow that is or includes VoIP data may be given a first LCG corresponding to a certain desired Quality of Service (QoS) level, while a data flow that is or includes short message service (SMS) data may be given a second LCG corresponding to a best effort (BE) indication. The first LCG may be understood to have a higher priority than the second LCG.

The buffer size bits 404 may indicate, as part of a pre-BSR message, the amount of data that the sending IAB node expects to receive (and/or has received) from an IAB node and/or a UE, in the manner described above.

The format for the MAC CE 400 for pre-BSR may in some embodiments match the format for a regular BSR.

One consideration when developing wireless communication systems using IAB is that of fairness. In an IAB topology, some UEs are further from an IAB donor/5GC than other UEs (see, for example, FIG. 1, where the UE 112 is more hops away from the IAB donor 102/5GC 104 than the UE 114). Accordingly, mechanisms for ensuring that the UE 112 may receive a QoS treatment for one or more of its data flows that is similar (in effect) to the QoS treatment it would receive if it were connected to, e.g., a gNB of the wireless communication system (without going through the IAB network 100) may be desirable. Further, mechanisms to prevent the UE 114 to be unfairly favored relative to the UE 112 due to its closer proximity (in hop distance) to the IAB donor 102/5GC 104 are also of interest.

Figure 5:
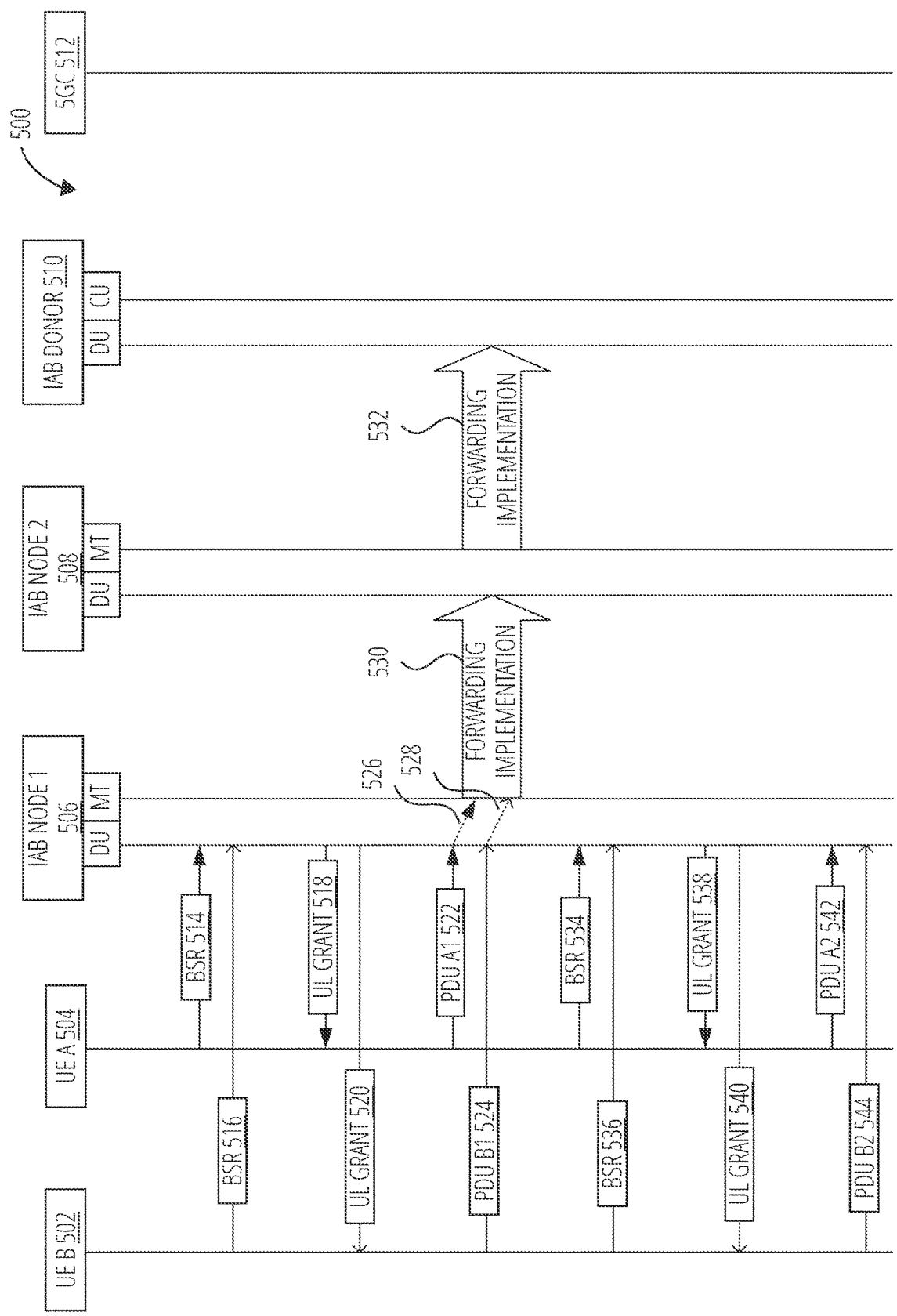
FIG. 5 illustrates a signaling flow showing various fairness issues that may arise when using various pre-BSR implementations across an IAB network, according to an embodiment.

FIG. 5 illustrates a signaling flow 500 showing various fairness issues that may arise when using various pre-BSR implementations across an IAB network, according to an embodiment. These issue may correspond to variations of pre-BSR implementation according to various different vendors of IAB nodes.

The signaling flow 500 includes the UE B 502, the UE A 504, the IAB node 1 506, the IAB node 2 508, the IAB donor 510, and the 5GC 512. Similarly to the signaling flow 300 of FIG. 3, the signaling flow 500 of FIG. 5 includes the BSR 514 from the UE A 504 to the DU of the IAB node 1 506 and the BSR 516 from the UE B 502 to the DU of the IAB node 1 506. The DU of the IAB node 1 506 responds with the UL grant 518 to the UE A 504 and the UL grant 520 to the UE B 502. The UE A 504 uses the resources indicated in the UL grant 518 to send the PDU A1 522 and the UE B 502 uses the resources indicated in the UL grant 520 to send the PDU B1 524. The DU of the IAB node 1 506 makes the first IAB node PDU A1 transfer 526 (corresponding to the PDU A1 522) and the first IAB node PDU B1 transfer 528 (corresponding to the PDU B1 524) to the IAB node 1 506. Similarly to FIG. 3, it is contemplated that either of the UE B 502 and/or the UE A 504 could each respectively represent a group of UEs, and/or that the PDU A1 522 and/or the PDU B1 524 could each respectively represent a group of PDUs.

The IAB node 1 506 may then select a first forwarding implementation 530 to perform relative the forwarding of the PDU A1 522 and the PDU B1 524. A forwarding implementation may involve the use of a BSR and/or a pre-BSR attendant to the forwarding of the PDUs, in the manner described above. In a first such case using the first forwarding implementation 530, the IAB node 1 506 determines not to perform pre-BSR, and instead waits for a window to send a common BSR for both the PDU A1 522 and the PDU B1 524. However, in this case, latency for the PDU A1 522 may be introduces relative to other possible methods.

In a second such case using the first forwarding implementation 530, the IAB node 1 506 performs a BSR for the PDU A1 522 and a pre-BSR for the PDU B1 524 during the first forwarding implementation 530. This case may correspond to the case illustrated in FIG. 3. In this case, it may be that the priority for the PDU B1 524 may not be maintained. This may be because the PDU A1 522 arrives prior to the PDU B1 524 and the BSR timer expired.

In a third such case using the first forwarding implementation 530, the IAB node 1 506 may not have any mechanism for a reprioritization of data flows with dynamic priority updates during the first forwarding implementation 530. This may not allow the IAB node 1 506 to respond to issues such a residual packet delay budgets (PDBs).

There are also downstream fairness issues as to cases of interactions of varying forwarding implementations at different IAB nodes (e.g., corresponding to different IAB node vendors). In a one such case, the IAB node 1 506 may be provided by a first vendor and may use the first forwarding implementation 530 that is of a first type that may trigger pre-BSR based on residual latency. The IAB node 2 508 may be provided by a second vendor and may use a second forwarding implementation 532 that prioritizes (e.g., triggers pre-BSR) based on a different algorithm that is not focused on responding to residual latency, or that uses regular BSR. In these cases, QoS performance and goals are IAB-implementation-dependent (and therefore could be divergent). A UE side application may therefore have uneven treatment throughout the IAB network represented by the signaling flow 500.

Accordingly, it may be beneficial to enhance existing implementations so that data flow prioritizations and latency boundaries can be met in IAB networks. Such modifications may allow for pre-BSR to be more than merely a BSR bypass mechanism. Further, such modifications my promote standardization of pre-BSR use between, for example, various vendors of IAB nodes.

As before, the UE B 502, the UE A 504, and the IAB node 1 506 may proceed by perform the processes shown for the new PDU A2 542 and the new PDU B2 544, as illustrated by the uses of the BSR 534 and the BSR 536, the respective responding UL grant 538 and UL grant 540, and the respective sending of the PDU A2 542 and the PDU B2 544.

A first enhancement to pre-BSR usage may be to allow an IAB node to re-classify the LCGs of one or more incoming data flows according to such pre-BSR usage. Such a modification may enable the use of additional resolution and/or granularity of priorities corresponding to outgoing LCGs than what is currently provided in a standard. In such reclassification schemes, it is contemplated that a first incoming LCG of a first incoming data flow, an incoming LCG of a second incoming data flow, and the outgoing LCG to which the first incoming data flow and the second incoming data flow have been assigned may all be different. In some embodiments, re-classification may be performed based on a configuration at an IAB node made by a CU of an IAB donor. In some embodiments, an IAB node may unilaterally make such re-classifications.

A first method of re-classifying incoming LCGs may use additional outgoing LCGs than previously contemplated. For example, a standard may limit the number of LCGs within the IAB network to 16. However, the number of data flows that an individual IAB node of an IAB network may need to handle may be very large. Further, an upper limit of 16 LCGs may not be sufficient to allow for a fuller set of re-prioritizations that may otherwise be achieved. For example, if only 16 LCGs are available, multiple data flows (in some cases, corresponding to individual logical channels (LCHs)) with minor QoS variations may be pooled into LCGs at only a rough resolution (e.g., using the 16 available LCGs) as those data flows propagate through the system. This consolidation may include wider and wider consolidations as various data flows of the IAB network proceed closer to the IAB donor (due to a need to consolidate more and more QoS types into the 16 available LCGs). Accordingly, it may be beneficial to allow for additional LCGs within the IAB network.

The use of additional LCGs may allow space for the various data flows in the IAB network to be re-prioritized (e.g., by being re-assigned to an LCG with a higher priority) based on latency requirements of that data flow. In some cases, this may occur in real time at the local IAB node. In other cases, a CU of an IAB donor can re-assign LCGs according to priority needs based on latency metrics that it gathers regarding the one or more data flows. Collection of such metrics at the CU may occur via a F1AP interface between one or more IAB nodes that reports information related to the latency metric to the CU of the IAB donor. This configuration by the CU may deal with/obviate any interoperability issue that may otherwise occur as between various IAB nodes, thus retaining a centralized architecture.

Due to this dynamic mapping of BH RLC flows (data flows), both intra-UE logical channel ID (LCID) prioritization and inter-TIE prioritization can be achieved.

One method for using additional LCGs in the IAB network may be to extend the MAC CE for pre-BST to include more LCG bits beyond what is allowed per a standard. For example, a standard may specify that up to 16 bits are available to represent LCGs in a MAC CE. Accordingly, more than 16 bits may be used. These bits may be provided at the end of a current MAC CE structure (such as the MAC CE structure illustrated in relation to FIG. 4).

In some of these cases, a CU of an IAB donor may create a list for this extension of LCGs and broadcast it to the various IAB nodes. In some cases, the list is pre-configured to each IAB node of the IAB network. The list for the extension of LCGs may be based on an addition of new QoS parameters (e.g., beyond those previously used in a standard), thus allowing for finer differences between different flows. In some embodiments, each IAB node of the IAB network is able to independently and dynamically re-assign incoming data flows to outgoing LCGs using methods described herein (e.g., without CU intervention). In some cases, dynamic assignments of IAB nodes may be reported to a CU of an IAB donor on a F1AP interface.

Various new possibilities are possible when using additional LCGs. For example, under prior systems, a first conversational voice flow having a 10 ms PDB may have formerly been grouped in the same LCG as a second conversational voice flow having a 5 ms PDB. This may have led to giving the 10 ms flow too much priority or the 5 ms flow not enough priority. These data flows may now be able to be grouped separately according to individual LCGs corresponding to the 10 ms and the 5 ms, respectively due to the availability of additional LCGs.

As a second example, it may be that two data flows both have a 10 ms PDB. However, the IAB node determines that while it can appropriately serve the first of the two data flows, it cannot appropriately serve the second of the two data flows (such that, without upstream adjustment, the 10 ms PDB can be met). Accordingly, the IAB node may reassign the second of the two data flows to an outgoing data flow with an LCG that is of a higher priority than an LCG of the first of the two data flows, such that its data is treated with a higher priority at the parent IAB node. This may be possible (even though both of the two data flows have the same PDB) due to the additional availability of LCGs in the IAB network.

In some embodiments, the CU sends a threshold to a downstream IAB node (or the IAB node is pre-configured with a threshold). In these cases, the IAB node may initially aggregate data flows with slightly different QoS characteristics into a single outgoing data flow (with a single LCG) in the case where there are not a threshold amount of data flows having one particular QoS (e.g., a particular PDB) from among the slightly different QoSs (e.g., slightly different, but close, PDB, such as 5 ms and 7 ms) being so used. Once there are a threshold amount of data flows having the one particular OOS (e.g., 5 ms), such data flows may be broken out and assigned their own outgoing data flow (with a corresponding unique LCG). This may be possible (even though both of the two data flows have the same PDB) due to the additional availability of LCGs in the IAB network.

A second method of re-classifying incoming LCGs may include the use of sub-LCGs. In other words, the system may have a set of LCGs that are used, but may further extend a MAC CE for pre-BSR to include sub-LCG bits. These bits may be provided at the end of a current MAC CE structure (such as the MAC CE structure illustrated in relation to FIG. 4). In some cases, this may occur as determined individually at the local IAB node. In other cases, a CU of an IAB donor may instead configure the IAB node to use a particular sub-LCG scheme.

Accordingly, incoming data flows having the same LCG but a different sub-LCG may be treated differently (e.g., assigned to different outgoing data flows). For example, an IAB node may understand a the first sub-LCG to be of a higher priority than the second sub-LCG. In response, the IAB node may assign the first data flow to an outgoing LCG with a sub-LCG of a first, higher priority, and the IAB node may assign the second data flow to the same outgoing DCG but with a sub-LCG of a second, lower priority.

In some embodiments, the size of the sub-LCG bits may be uniform for all LCGs (e.g., 4 bits). In other embodiments, the size of the sub-LCG bits may depend on the LCG with which the sub-LCG bits are being used. For example, a first LCG (perhaps corresponding to a high QoS requirement) may be configured to use 2 sub-LCG bits, and a second LCG (perhaps corresponding to a best effort (BE) requirement) may be configured to use 8 sub-LCG bits. This may be because wider variation in priority (corresponding to more sub-LCG bits) is permissible in the BE case over the high QoS case. A correspondence between an individual LCG and a size of its sub-LCG indication may be configured by the CU, or may be one that is broadcasted by the IAB node in question.

A third method of re-classifying incoming LCGs may be to use the buffer size itself to indicate to the parent IAB node the priority of the outgoing data flow for a particular outgoing LCG to which the incoming data flows are assigned.

This third method may use additional grants for all LCGs that keep requesting pre-BSR or BSR beyond a certain threshold; accordingly, the child node may request the parent IAB node for additional resources. In such instances, the parent IAB node may provide additional resources through configured grants for a duration, until the fairness, latency, and/or congestion constraints on the child IAB node are resolved.

In some embodiments of this third method, the system may extend a MAC CE for pre-BSR to include further LCG classification information bits in the buffer size area of the MAC CE inline with the buffer size information.

In some embodiments of this third method, for each outgoing LCG, the child node may indicate the number of incoming data flows that have been assigned to the outgoing LCG (e.g., the number incoming data flows that have been aggregated). The child node may additionally indicate, for each outgoing LCG, how many incoming LCG variants are represented by the incoming data flows assigned to the outgoing LCG (e.g., the number of variants of incoming LCGs of the incoming data flows that have been merged together). This allows the parent IAB node to use such aggregation and variant information to make decisions to prioritize on how to prioritize the outgoing data flow (which is its incoming data flow) over/under, for example, one or more other of its other incoming data flows.

In some embodiments of this third method, this classification (either as a threshold or as an inline request) may occur as determined individually at the local IAB node. In other cases, a CU of an IAB donor may configure the IAB node to use such further classification bits in the manner described.

Figure 6:
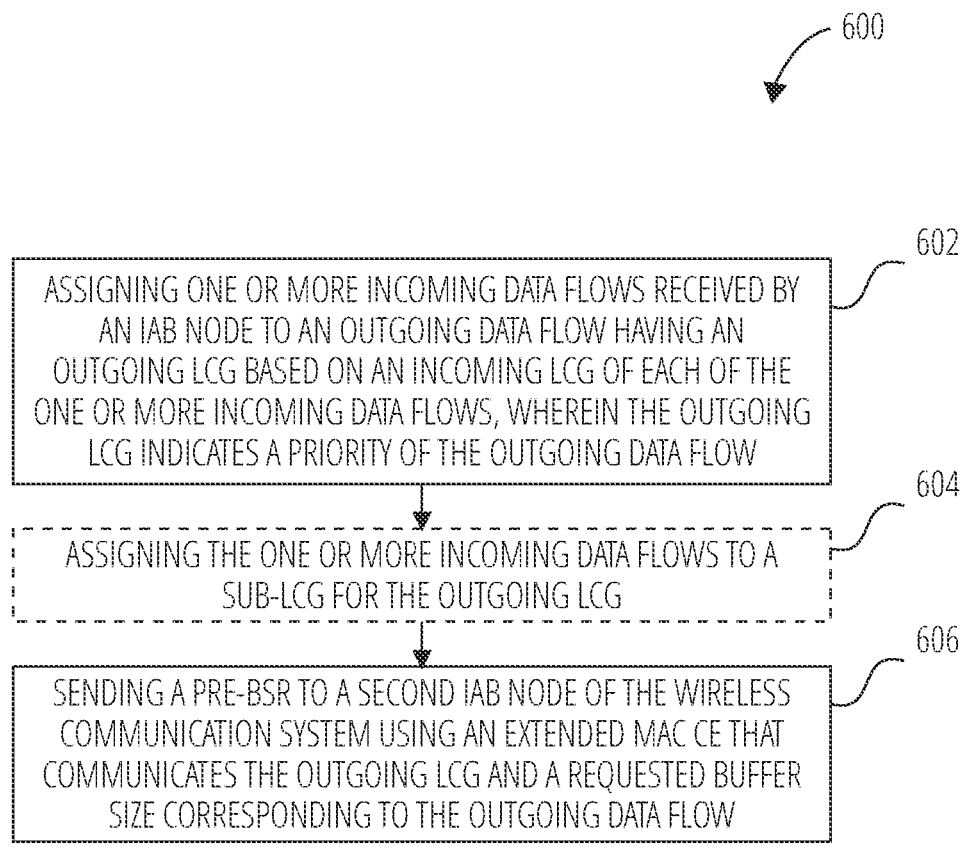
FIG. 6 illustrates a method of an IAB node of a wireless communication system, according to an embodiment.

FIG. 6 illustrates a method 600 of an IAB node of a wireless communication system, according to an embodiment.

The method 600 includes assigning 602 one or more incoming data flows received by an IAB node to an outgoing data flow having an outgoing LCG based on an incoming LCG of each of the one or more incoming data flows, wherein the outgoing LCG indicates a priority of the outgoing data flow.

The method 600 further optionally includes assigning 604 the one or more incoming data flows to a sub-LCG for the outgoing LCG.

The method 600 further includes sending 606 a pre-BSR to a second IAB node of the wireless communication system using an extended MAC CE that communicates the outgoing LCG and a requested buffer size corresponding to the outgoing data flow.

In some embodiments of the method 600 that include the assigning 604, the extended MAC CE further comprises an indication of the sub-LCG. In some of these embodiments, a size of the indication of the sub-LCG in the extended MAC CE corresponds to the outgoing LCG. In some of these embodiments, the sub-LCG is one of a number of sub-LCGs configured for use with the outgoing LCG by an integrated access and backhaul (IAB) control unit (CU).

In some embodiments of the method 600, the assignment of the one or more incoming data flows to the outgoing data flow is based on a configuration provided to the IAB node by an IAB CU.

In some embodiments of the method 600, an incoming LCG of a first of the one or more incoming data flows, an incoming LCG of a second of the one or more incoming data flows, and the outgoing LCG are all different.

In some embodiments of the method 600, a size of the outgoing LCG is extended beyond the range of current MAC CE. For example, in some embodiments of the method 600, the outgoing LCG is represented in the extended MAC CE using more than 16 bits.

In some embodiments of the method 600, the outgoing LCG of the one or more incoming data flows is determined based on a comparison of a number of the one or more incoming data flows with a threshold received from an IAB CU.

In some embodiments of the method 600, the extended MAC CE further indicates a number of the one or more incoming data flows.

In some embodiments of the method 600, the extended MAC CE further indicates a number of unique LCGs among the one or more incoming data flows.

Embodiments contemplated herein include an apparatus comprising means to perform one or more elements of the method 600. This apparatus may be, for example, an apparatus of a UE 900 as described below.

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, the memory 906 of the UE 900 described below, and/or the peripheral devices 1304, the memory/storage devices 1314, and/or the databases 1320 of the components 1300 as described below.

Embodiments contemplated herein include an apparatus comprising logic, modules, or circuitry to perform one or more elements of the method 600. This apparatus may be, for example, an apparatus of a UE 900 as described below.

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a UE 900 as described below.

Embodiments contemplated herein include a signal as described in or related to one or more elements of the method 600.

Embodiments contemplated herein include a datagram, packet, frame, segment, protocol data unit (PDU), or message as described in or related to one or more elements of the method 600.

Embodiments contemplated herein include a signal encoded with data as described in or related to one or more elements of the method 600.

Embodiments contemplated herein include a signal encoded with a datagram, packet, frame, segment, PDU, or message as described in or related to one or more elements of the method 600.

Embodiments contemplated herein include an electromagnetic signal carrying computer-readable instructions, wherein execution of the computer-readable instructions by one or more processors is to cause the one or more processors to perform one or more elements of the method 600.

Embodiments contemplated herein include a computer program comprising instructions, wherein execution of the program by a processing element is to cause the processing element to carry out one or more elements of the method 600. These instructions may be, for example, the instructions 1312 of the components 1300 as described below.

A second enhancement to pre-TSR use may be to introduce a new priority index for LCGs in the pre-BSR MAC CE. In other words, the MAC Cl could be extended to additionally include the priority index corresponding to an outgoing data flow. The priority index used at an IAB node may be based on a residual PDB information for the outgoing data flow provided by a CU of an IAB donor to the IAB node. The various one or more fields of the priority index used for an outgoing LCG at an IAB node may be updated by the IAB node or the CU in real time based on current traffic conditions at the IAB node.

The priority index may include a priority field corresponding to priority of an outgoing LCG at the IAB node. An IAB node may determine to increase or decrease the priority of the outgoing LCG in question. An indication of the new priority of the outgoing LCG is then informed (ultimately) to the CU of the IAB donor using an extended MAC CE having a priority index.

The priority index may include a prioritized bit rate (PBR) corresponding to the PBR of an outgoing LCG at the IAB node. An IAB node may determine to increase or decrease the PBR of the outgoing LCG in question. An indication of the new PBR of the outgoing LCG is then informed (ultimately) to the CU of the IAB donor using an extended MAC CE having a priority index.

The priority index may include a bucket size duration (BSD) corresponding to a BSD of the outgoing LCG at the IAB node. An IAB node may determine to increase or decrease the BSD of the outgoing LCG in question. An indication of the new BSD of the outgoing LCG is then informed (ultimately) to the CU of the IAB donor using an extended MAC CE having a priority index. This indication can be made across UEs in both 1:1 and N:1 BH RLC configurations.

In some embodiments, an IAB node may extend the MAC CE for each outgoing data flow (each outgoing LCG) to include the priority index. This may allow for a parent JAB node to use an averaging algorithm of its own based on the overall system performance a propagate this back to the CU. In some instances, if a condition of a modified priority at the IAB node persists, the CU (using either an RRC reconfiguration message, a RAP message, or a F1AP message) can modify the priority fields of the priority indexes of the IAB nodes in the affected data path where the information is needed.

Figure 7:
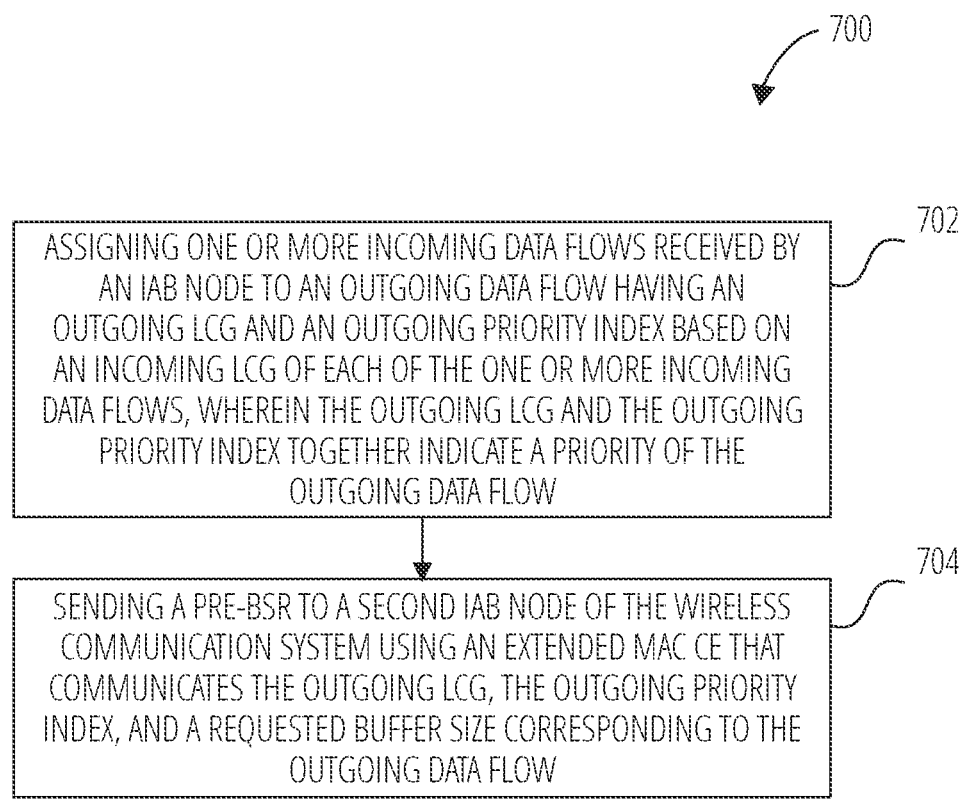
FIG. 7 illustrates a method of an IAB node of a wireless communication system, according to an embodiment.

FIG. 7 illustrates a method 700 of an IAB node of a wireless communication system, according to an embodiment.

The method 700 includes assigning 702 one or more incoming data flows received by an IAB node to an outgoing data flow having an outgoing LCG and an outgoing priority index based on an incoming LCG of each of the one or more incoming data flows, wherein the outgoing LCG and the outgoing priority index together indicate a priority of the outgoing data flow.

The method 700 further includes sending 704 a pre-BSR to a second IAB node of the wireless communication system using an extended MAC CE that communicates the outgoing LCG, the outgoing priority index, and a requested buffer size corresponding to the outgoing data flow.

In some embodiments of the method 700, the assignment of the one or more incoming data flows to the outgoing data flow is further based on an incoming priority index of each of the one or more incoming data flows.

In some embodiments of the method 700, the outgoing priority index for the outgoing LCG is determined based on a PDB parameter received from an IAB CU.

In some embodiments of the method 700, the outgoing priority index comprises one or more of a priority field, a PBR field, and a BSD field.

In some embodiments of the method 700, the outgoing priority index is chosen by the IAB node according to a configuration received from an integrated access and backhaul (IAB) control unit (CU).

Embodiments contemplated herein include an apparatus comprising means to perform one or more elements of the method 700. This apparatus may be, for example, an apparatus of a UE 900 as described below.

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, the memory 906 of the UE 900 described below, and/or the peripheral devices 1304, the memory/storage devices 1314, and/or the databases 1320 of the components 1300 as described below.

Embodiments contemplated herein include an apparatus comprising logic, modules, or circuitry to perform one or more elements of the method 700. This apparatus may be, for example, an apparatus of a UE 900 as described below.

Embodiments contemplated herein include an apparatus comprising: one or more processors and one or more computer-readable media comprising instructions that, when executed by the one or more processors, cause the One or more processors to perform one or more elements of the method 700. This apparatus may be, for example, an apparatus of a UE 900 as described below.

Embodiments contemplated herein include a signal as described in or related to one or more elements of the method 700.

Embodiments contemplated herein include a datagram, packet, frame, segment, protocol data unit (PDU), or message as described in or related to one or more elements of the method 700.

Embodiments contemplated herein include a signal encoded with data as described in or related to one or more elements of the method 700.

Embodiments contemplated herein include a signal encoded with a datagram, packet, frame, segment, PDU, or message as described in or related to one or more elements of the method 700.

Embodiments contemplated herein include an electromagnetic signal carrying computer-readable instructions, wherein execution of the computer-readable instructions by one or more processors is to cause the one or more processors to perform one or more elements of the method 700.

Embodiments contemplated herein include a computer program comprising instructions, wherein execution of the program by a processing element is to cause the processing element to carry out one or more elements of the method 700. These instructions may be, for example, the instructions 1312 of the components 1300 as described below.

Combinations of the re-classifications described in relation to FIG. 6 and the use of a priority index as described in FIG. 7 are contemplated.

A third enhancement to pre-BSR may be through providing additional grants. For example, in these cases, an IAB node may determine that a traffic condition is above a threshold for a BH RlX channel or routing ID corresponding to an incoming data flow (with an associated LCG). The threshold may be, for example, a maximum number of data flows received at the child IAB node that is included by the child IAB node in the child IAB node's outgoing data flow that is the IAB node's incoming data flow. This may correspond to an unforeseen negative condition, such as excessive latency or excessive load. The IAB node may then provide additional grants to the child node to resolve the unforeseen condition. It is contemplated that the additional grants may be provided by the IAB node to the child IAB node according to a configuration of the IAB node made by a CU of an IAB donor. These additional grants may effectively bump up the priority of the incoming data flow (or a group of incoming data flows) from the child IAB node to the IAB node.

It is contemplated that in these cases, a child IAB node may provide information regarding an aggregate number of BH RLC flows that are part of the outgoing LCG of the child IAB node to the IAB node. This may represent an overall latency criteria.

The use of the additional granting mechanism may allow the child IAB node to use a pre-BSR implementation without invoking (at least as often) the issues with pre-BSR mechanisms as described in, for example or FIG. 5 (because of a reduced frequency pre-BSR use more generally as a result of the additional grants).

Figure 8:
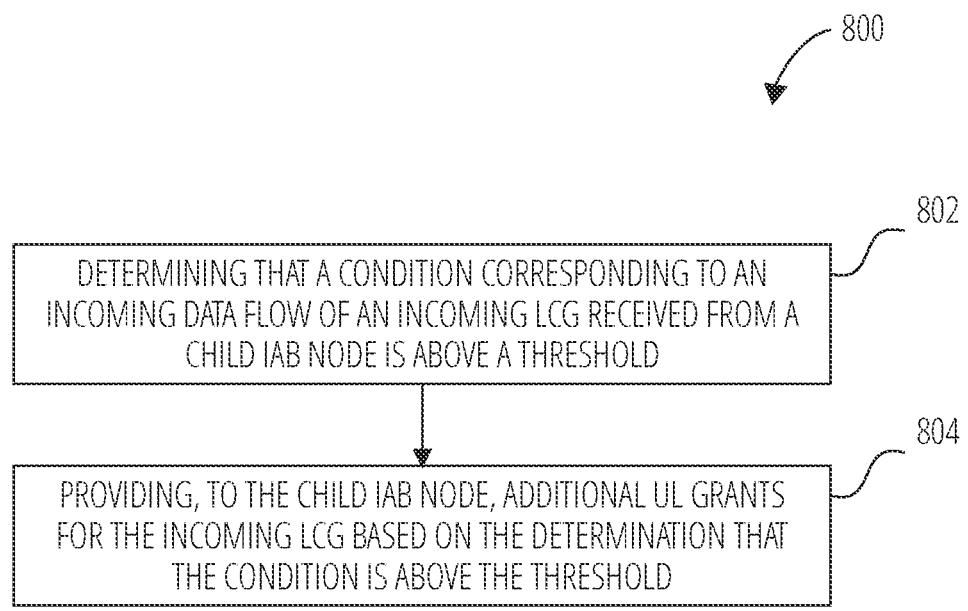
FIG. 8 illustrates a method of an IAB node of a wireless communication system, according to an embodiment.

FIG. 8 illustrates a method 800 of an IAB node of a wireless communication system, according to an embodiment.

The method 800 comprises determining 802 that a condition corresponding to an incoming data flow of an incoming LCG received from a child IAB node is above a threshold.

The method 800 further comprises providing 804, to the child IAB node, additional UL grants for the incoming LCG based on the determination that the condition is above the threshold.

In some embodiments of the method 800, the threshold is configured at the IAB node by an integrated access and backhaul (IAB) control unit (CU).

In some embodiments of the method 800, the condition is a number of data flows received at the child IAB node that is included in the incoming data flow, and the threshold is a maximum number of data flows received at the child IAB node that is included in the incoming data flow.

In some embodiments of the method 800, the child IAB node communicates a status of the condition to the IAB node.

Embodiments contemplated herein include an apparatus comprising means to perform one or more elements of the method 800. This apparatus may be, for example, an apparatus of a UE 900 as described below.

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, the memory 906 of the UE 900 described below, and/or the peripheral devices 1304, the memory/storage devices 1314, and/or the databases 1320 of the components 1300 as described below.

Embodiments contemplated herein include an apparatus comprising logic, modules, or circuitry to perform one or more elements of the method 800. This apparatus may be, for example, an apparatus of a UE 900 as described below.

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a UE 900 as described below.

Embodiments contemplated herein include a signal as described in or related to one or more elements of the method 800.

Embodiments contemplated herein include a datagram, packet, frame, segment, protocol data unit (PDU), or message as described in or related to one or more elements of the method 800.

Embodiments contemplated herein include a signal encoded with data as described in or related to one or more elements of the method 800.

Embodiments contemplated herein include a signal encoded with a datagram, packet, frame, segment, PDU, or message as described in or related to one or more elements of the method 800.

Embodiments contemplated herein include an electromagnetic signal carrying computer-readable instructions, wherein execution of the computer-readable instructions by one or more processors is to cause the one or more processors to perform one or more elements of the method 800.

Embodiments contemplated herein include a computer program comprising instructions, wherein execution of the program by a processing element is to cause the processing element to carry out one or more elements of the method 800. These instructions may be, for example, the instructions 1312 of the components 1300 as described below.

Combinations of the re-classifications described in relation to FIG. 6, the use of a priority index as described in FIG. 7, and/or the use of additional grants as described in relation to FIG. 8 are contemplated.

It is contemplated that any of the methods represented in, for example, FIG. 6 through FIG. 8 may be used as part of an enhanced IAB (eIAB) network.

Figure 9:
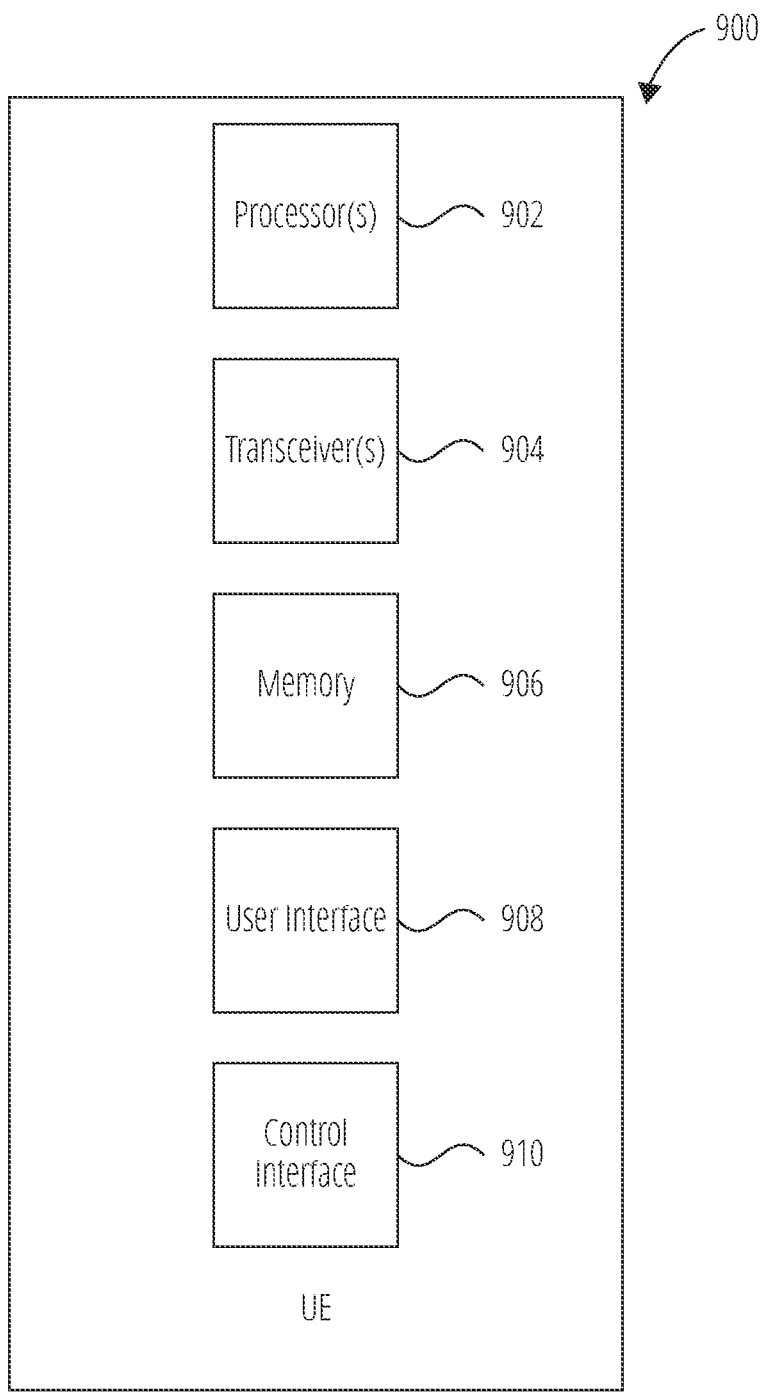
FIG. 9 illustrates a UE in accordance with one embodiment.

FIG. 9 is a block diagram of an example UE 900 configurable according to various embodiments of the present disclosure, including by execution of instructions on a computer-readable medium that correspond to any of the example methods and/or procedures described herein. The UE 900 comprises one or more processor 902, transceiver 904, memory 906, user interface 908, and control interface 910.

The one or more processor 902 may include, for example, an application processor, an audio digital signal processor, a central processing unit, and/or one or more baseband processors. Each of the one or more processor 902 may include internal memory and/or may include interface(s) to communication with external memory (including the memory 906). The internal or external memory can store software code, programs, and/or instructions for execution by the one or more processor 902 to configure and/or facilitate the UE 900 to perform various operations, including operations described herein. For example, execution of the instructions can configure the UE 900 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 904, user interface 908, and/or control interface 910. As another example, the one or more processor 902 may execute program code stored in the memory 906 or other memory that corresponds to MAC, RLC, PDCP, and RRC layer protocols standardized by 3GPP (e.g., for NR and/or LTE). As a further example, the processor 902 may execute program code stored in the memory 906 or other memory that, together with the one or more transceiver 904, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 906 may comprise memory area for the one or more processor 902 to store variables used in protocols, configuration, control, and other functions of the UE 900, including operations corresponding to, or comprising, any of the example methods and/or procedures described herein. Moreover, the memory 906 may comprise non-volatile memory (e.g., flash memory), volatile memory (e.g., static or dynamic RAM), or a combination thereof. Furthermore, the memory 906 may interface with a memory slot by which removable memory cards in one or more formats (e.g., SD Card, Memory Stick, Compact Flash, etc.) can be inserted and removed.

The one or more transceiver 904 may include radio-frequency transmitter and/or receiver circuitry that facilitates the UE 900 to communicate with other equipment supporting like wireless communication standards and/or protocols. For example, the one or more transceiver 904 may include switches, mixer circuitry, amplifier circuitry, filter circuitry, and synthesizer circuitry. Such RE circuitry may include a receive signal path with circuitry to down-convert RE signals received from a front-end module (FEM) and provide baseband signals to a baseband processor of the one or more processor 902. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RE circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RE circuitry and the FEM circuitry. In some embodiments, the FEM circuitry may include a TX/RX switch to switch between transmit mode and receive mode operation.

In some exemplary embodiments, the one or more transceiver 904 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 902 to implement a PHY layer based on OFDM, OFDMA, and/or SC-FDMA technologies, such as described herein with respect to other figures.

The user interface 908 may take various forms depending on particular embodiments, or can be absent from the UE 900. In some embodiments, the user interface 908 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 900 may comprise a tablet computing device including a larger touchscreen display. In such embodiments, one or more of the mechanical features of the user interface 908 may be replaced by comparable or functionally equivalent virtual user interface features (e.g., virtual keypad, virtual buttons, etc.) implemented using the touchscreen display, as familiar to persons of ordinary skill in the art. In other embodiments, the UE 900 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 900 having a touch screen display are capable of receiving user inputs, such as inputs related to exemplary methods and/or procedures described herein or otherwise known to persons of ordinary skill in the art.

In some exemplary embodiments of the present disclosure, the UE 900 may include an orientation sensor, which can be used in various ways by features and functions of the UE 900. For example, the UE 900 can use outputs of the orientation sensor to determine when a user has changed the physical orientation of the UF 900's touch screen display. An indication signal from the orientation sensor can be available to any application program executing on the UE 900, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 910 may take various forms depending on particular embodiments. For example, the control interface 910 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 910 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 900 may include more functionality than is shown in FIG. 9 including, for example, a video and/or still-image camera, microphone, media player and/or recorder, etc. Moreover, the one or more transceiver 904 may include circuitry for communication using additional radio-frequency communication standards including Bluetooth, GPS, and/or others. Moreover, the one or more processor 902 may execute software code stored in the memory 906 to control such additional functionality. For example, directional velocity and/or position estimates output from a GPS receiver can be available to any application program executing on the UE 900, including various exemplary methods and/or computer-readable media according to various exemplary embodiments of the present disclosure.

Figure 10:
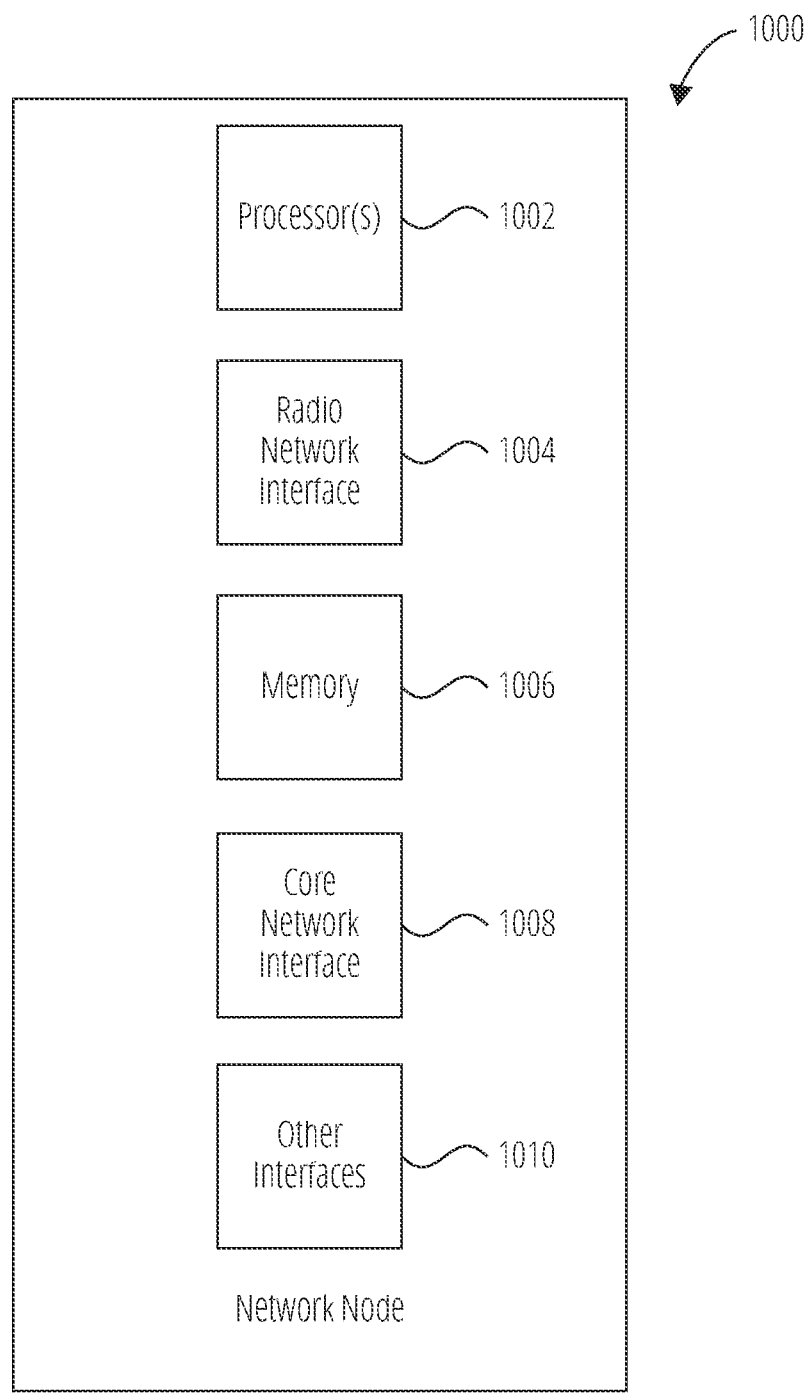
FIG. 10 illustrates a network node in accordance with one embodiment.

FIG. 10 is a block diagram of an example network node 1000 configurable according to various embodiments of the present disclosure, including by execution of instructions on a computer-readable medium that correspond to any of the example methods and/or procedures described herein.

The network node 1000 includes a one or more processor 1002, a radio network interface 1004, a memory 1006, a core network interface 1008, and other interfaces 1010. The network node 1000 may comprise, for example, a base station, gNB, access node, or component thereof.

The one or more processor 1002 may include any type of processor or processing circuitry and may be configured to perform an of the methods or procedures disclosed herein. The memory 1006 may store software code, programs, and/or instructions executed by the one or more processor 1002 to configure the network node 1000 to perform various operations, including operations described herein. For example, execution of such stored instructions can configure the network node 1000 to communicate with one or more other devices using protocols according to various embodiments of the present disclosure, including one or more methods and/or procedures discussed above. Furthermore, execution of such stored instructions can also configure and/or facilitate the network node 1000 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1004 and the core network interface 1008. By way of example and without limitation, the core network interface 1008 comprise an S1 interface and the radio network interface 1004 may comprise a Uu interface, as standardized by 3GPP. The memory 1006 may also store variables used in protocols, configuration, control, and other functions of the network node 1000. As such, the memory 1006 may comprise non-volatile memory (e.g., flash memory, hard disk, etc.), volatile memory (e.g., static or dynamic RAM), network-based (e.g., "cloud") storage, or a combination thereof.

The radio network interface 1004 may include transmitters, receivers, signal processors, ASICs, antennas, beamforming units, and other circuitry that enables network node 1000 to communicate with other equipment such as, in some embodiments, a plurality of compatible user equipment (UE). In some embodiments, the network node 1000 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1004 may include a PHY layer based on OFDM, OFDMA, and/or SC-FDMA technologies. In some embodiments, the functionality of such a PHY layer can be provided cooperatively by the radio network interface 1004 and the one or more processor 1002.

The core network interface 1008 may include transmitters, receivers, and other circuitry that enables the network node 1000 to communicate with other equipment in a core network such as, in some embodiments, circuit-switched (CS) and/or packet-switched Core (PS) networks. In some embodiments, the core network interface 1008 may include the S1 interface standardized by 3GPP. In some embodiments, the core network interface 1008 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1008 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1010 may include transmitters, receivers, and other circuitry that enables the network node 1000 to communicate with external networks, computers, databases, and the like for purposes of operations, administration, and maintenance of the network node 1000 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 11:
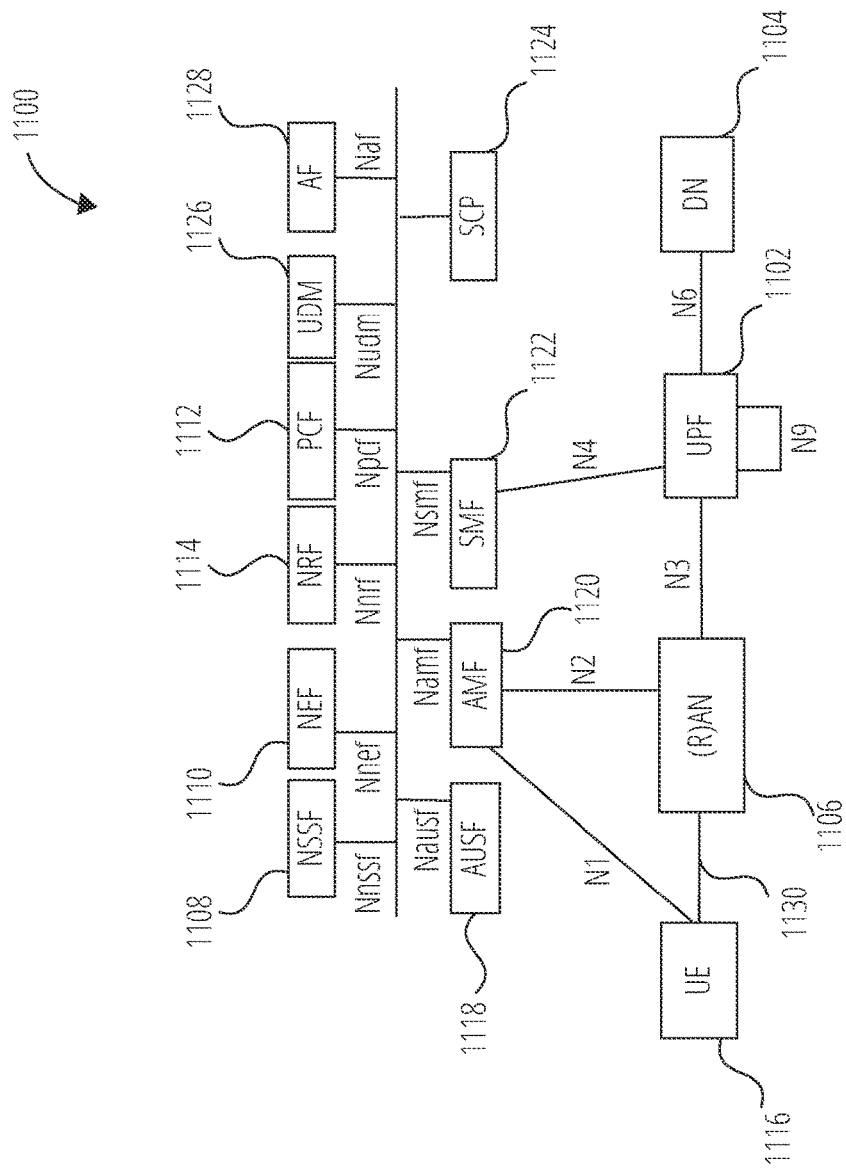
FIG. 11 illustrates an example service based architecture in accordance with certain embodiments.

FIG. 11 illustrates a service based architecture 1100 in 5GS according to one embodiment. As described in 3GPP TS 23.501, the service based architecture 1100 comprises NFs such as an NSSF 1108, a NEF 1110, an NRF 1114, a PCF 1112, a UDM 1126, an AUSF 1118, an AMF 1120, an SMF 1122, for communication with a UE 1116, a (R)AN 1106, a UPF 1102, and a DN 1104. The NFs and NF services can communicate directly, referred to as Direct Communication, or indirectly via a SCP 1124, referred to as Indirect Communication. FIG. 11 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 11 are described below.

The NSSF 1108 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1110 supports exposure of capabilities and events. NF capabilities and events may be securely exposed by the NEF 1110 (e.g., for 3rd party, Application Functions, and/or Edge Computing). The NEF 1110 may store/retrieve information as structured data using a standardized interface (Nudr) to a UDR. The NEF 1110 may also secure provision of information from an external application to 3GPP network and may provide for the Application Functions to securely provide information to the 3GPP network (e.g., expected UE behavior, 5GLAN group information, and service specific information), wherein the NEF 1110 may authenticate and authorize and assist in throttling the Application Functions. The NEF 1110 may provide translation of internal-external information by translating between information exchanged with the AF 1128 and information exchanged with the internal network function. For example, the NEF 1110 translates between an AF-Service-Identifier and internal 5G Core information such as DNN and S-NSSAI. The NEF 1110 may handle masking of network and user sensitive information to external AF's according to the network policy. The NEF 1110 may receive information from other network functions (based on exposed capabilities of other network functions), and stores the received information as structured data using a standardized interface to a UDR. The stored information can be accessed and re-exposed by the NEF 1110 to other network functions and Application Functions, and used for other purposes such as analytics. For external exposure of services related to specific UE(s), the NEF 1110 may reside in the HPLMN. Depending on operator agreements, the NEF 1110 in the HPLMN may have interface(s) with NF(s) in the VPLMN. When a UE is capable of switching between EPC and 5GC, an SCEF+NEF may be used for service exposure.

The NRF 1114 supports service discovery function by receiving an NF Discovery Request from an NF instance or SCP and providing the information of the discovered NF instances to the NF instance or SCP. The NRF 1114 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1112 supports a unified policy framework to govern network behavior. The PCF 1112 provides policy rules to Control Plane function(s) to enforce them. The PCF 1112 accesses subscription information relevant for policy decisions in a Unified Data Repository (UDR). The PCF 1112 may access the UDR located in the same PLMN as the PCF.

The UDM 1126 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SME for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1126 uses subscription data (including authentication data) that may be stored in a UDR, in which case a UDM implements the application logic and may not require an internal user data storage and several different UDMs may serve the same user in different transactions. The UDM 1126 may be located in the HPLMN of the subscribers it serves, and may access the information of the UDR located in the same PLMN.

The AUSF 1118 supports authentication for 3GPP access and untrusted non-3GPP access. The AUSF 1118 may also provide support for Network Slice-Specific Authentication and Authorization.

The AMF 1120 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1120. Regardless of the number of Network functions, in certain embodiments there is only one NAS interface instance per access network between the UE and the CN, terminated at one of the Network functions that implements at least NAS security and Mobility Management. The AMF 1120 may also include policy related functionalities.

In addition to the functionalities described above, the AMF 1120 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1122 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities the SMF 1122 may include policy related functionalities.

The SCP 1124 includes one or more of the following functionalities: indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the IJDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1124 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1116 may include a device with radio communication capabilities. For example, the UE 1116 may comprise a smartphone (e.g., handheld touchscreen mobile computing devices connectable to one or more cellular networks). The UE 1116 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1116 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications, e.g., keep-alive messages, status updates, etc.) to facilitate the connections of the IoT network.

The UE 1116 may be configured to connect or communicatively couple with the (R)AN 1106 through a radio interface 1130, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1116 and the (R)AN 1106 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 1106 to the UE 1116 and a UL transmission may be from the UE 1116 to the (R)AN 1106. The UE 1116 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1106 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g, terrestrial access points) or satellite stations providing coverage within a geographic area (e.g., a cell). The (R)AN 1106 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), for users in the home, etc.).

Although not shown, multiple RAN nodes (such as the (R)AN 1106) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1116 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1102 may act as an anchor point for intra-RAT and inter-RAT mobility, an external PDU session point of interconnect to the DN 1104, and a branching point to support multi-homed PDU session. The UPF 1102 may also perform packet routing and forwarding, packet inspection, enforce user plane part of policy rules, lawfully intercept packets (UP collection) traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1102 may include an uplink classifier to support routing traffic flows to a data network. The DN 1104 may represent various network operator services, Internet access, or third party services. The DN 1104 may include, for example, an application server.

Figure 12:
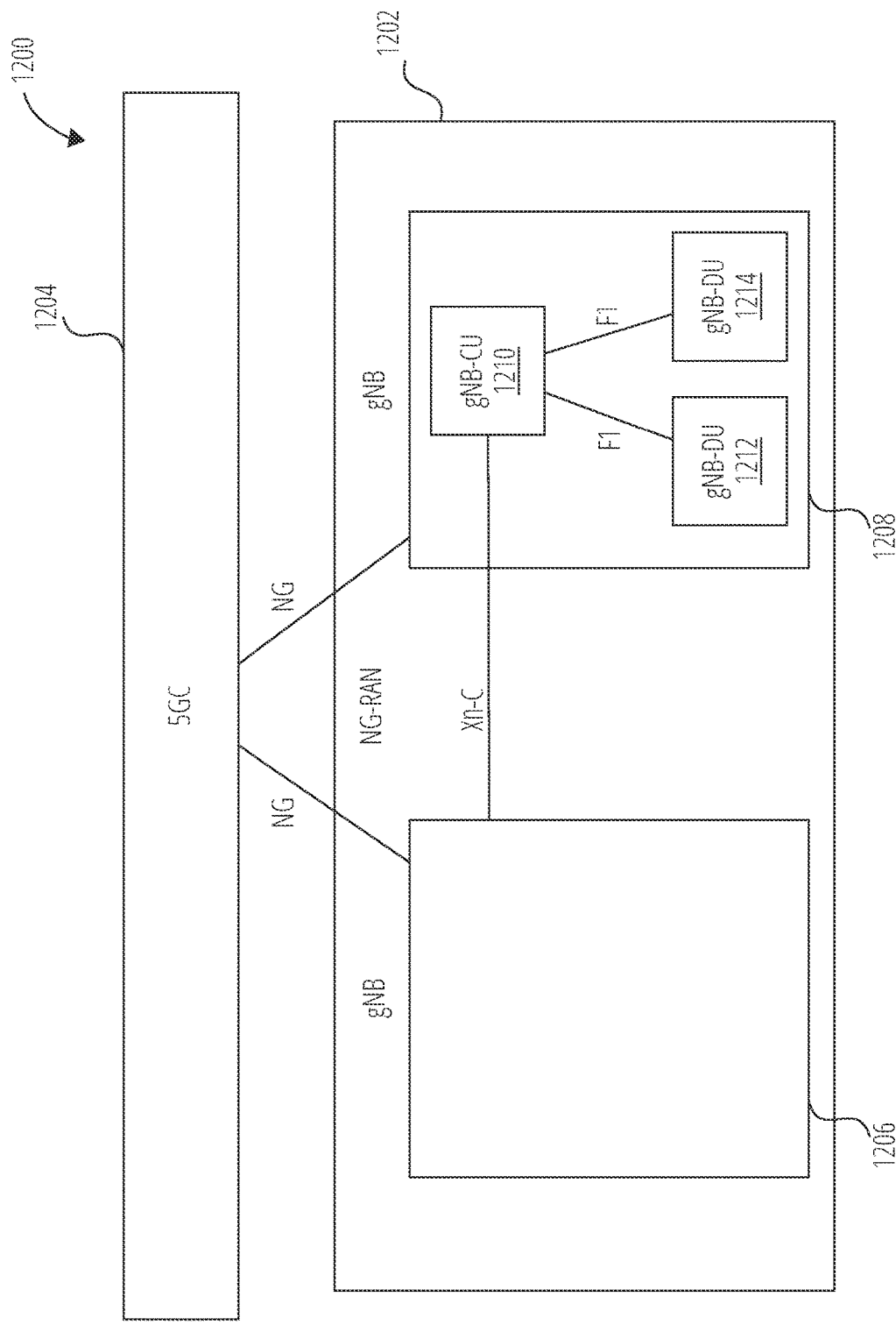
FIG. 12 illustrates an NG-RAN architecture in accordance with one embodiment.

FIG. 12 illustrates an NG-RAN architecture 1200, according to one embodiment, comprising a 5GC 1204 and an NG-RAN 1202. The NG-RAN 1202 includes a plurality of gNB (two gNB shown as gNB 1206 and gNB 1208) connected to the 5GC 1204 through the NG interface. The gNB 1206 and gNB 1208 can support FDD mode, TDD mode, or dual mode operation, and are connected to one another through the Xn-C interface. As shown, the gNB 1208 includes a gNB-CU 1210 connected to a gNB-DU 1212 and a gNB-DU 1214 through the F1 interface. The gNB 1208 may include only a single gNB-DU or more than the two gNB-DUs shown. The NG interface, Xn-C interface, and F1 interface are logical interfaces.

Figure 13:
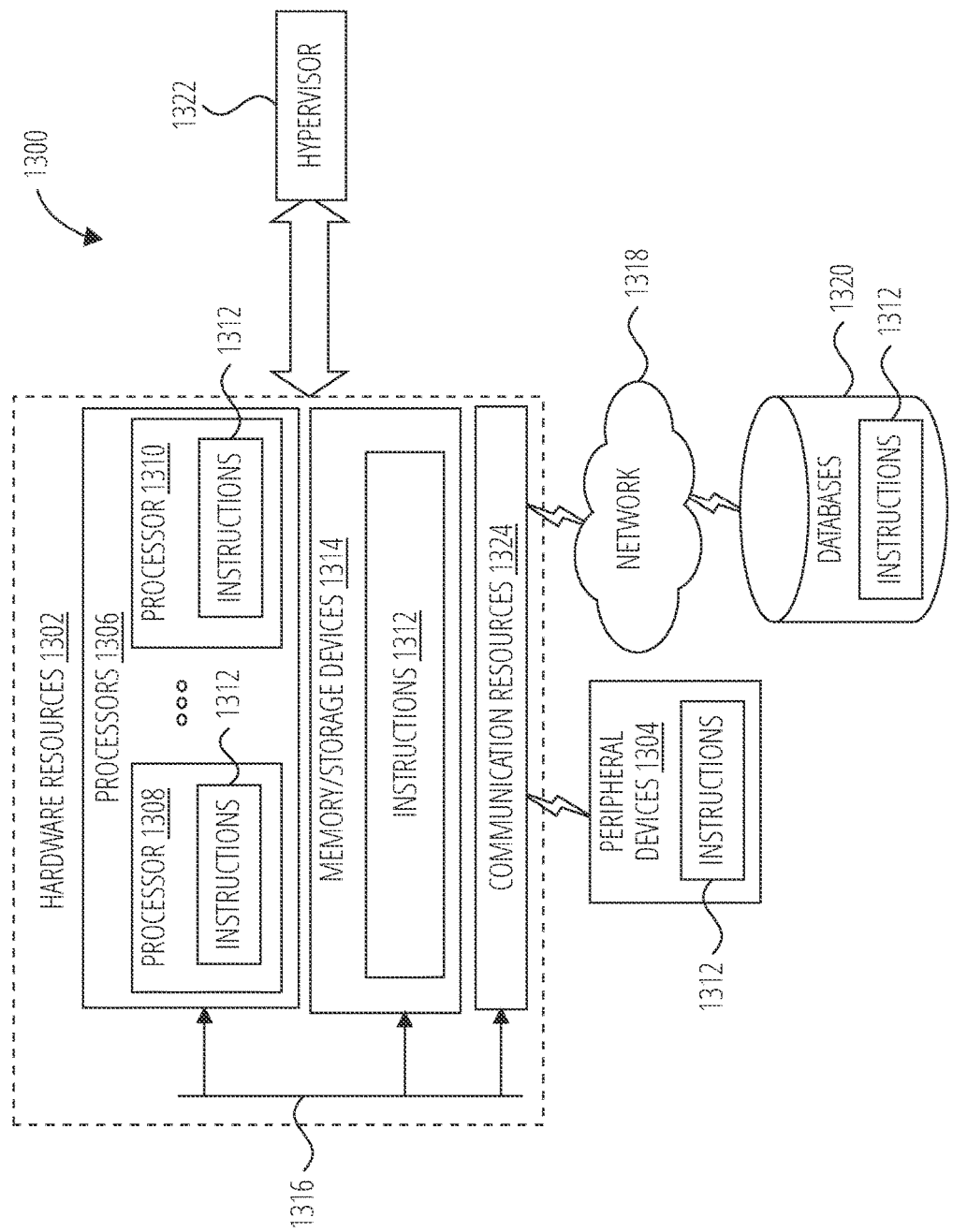
FIG. 13 illustrates components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically. FIG. 13 shows a diagrammatic representation of hardware resources 1302 including one or more processors 1306 (or processor cores), one or more memory/storage devices 1314, and one or more communication resources 1324, each of which may be communicatively coupled via a bus 1316. For embodiments where node virtualization (e.g., NFV) is utilized, a hypervisor 1322 may be executed to provide an execution environment for one or more network slices/sub-slices to utilize the hardware resources 1302.

The processors 1306 (e.g., a central processing unit (CPU), a reduced instruction set computing (RISC) processor, a complex instruction set computing (CNC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1308 and a processor 1310.

The memory/storage devices 1314 may include main memory, disk storage, or any suitable combination thereof. The memory/storage devices 1314 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1324 may include interconnection or network interface components or other suitable devices to communicate with one or more peripheral devices 1304 or one or more databases 1320 via a network 1318. For example, the communication resources 1324 may include wired communication components (e.g., for coupling via a Universal Serial Bus (USB)), cellular communication components, NFC components, Bluetooth® components (e.g., Bluetooth® Low Energy), components, and other communication components.

Instructions 1312 may comprise software, a program, an application, an applet, an app, or other executable code for causing at least any of the processors 1306 to perform any one or more of the methodologies discussed herein. The instructions 1312 may reside, completely or partially, within at least one of the processors 1306 (e.g., within the processor's cache memory), the memory/storage devices 1314, or any suitable combination thereof. Furthermore, any portion of the instructions 1312 may be transferred to the hardware resources 1302 from any combination of the peripheral devices 1304 or the databases 1320. Accordingly, the memory of the processors 1306, the memory/storage devices 1314, the peripheral devices 1304, and the databases 1320 are examples of computer-readable and machine-readable media.

For one or more embodiments, at least one of the components set forth in one or more of the preceding figures may be configured to perform one or more operations, techniques, processes, and/or methods as described herein. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of an integrated access and backhaul (IAB) node of a wireless communication system, comprising:
assigning one or more incoming data flows received by the IAB node to an outgoing data flow having an outgoing logical channel group (LCG) based on an incoming LCG of each of the one or more incoming data flows, wherein the outgoing LCG indicates a priority of the outgoing data flow, wherein the assignment of the one or more incoming data flows to the outgoing data flow is based on a configuration provided to the IAB node by an IAB control unit (CU), and wherein the outgoing LCG is determined based on a comparison of a number of the one or more incoming data flows with a threshold amount of data flows that is received from the IAB CU; and sending a pre-emptive buffer status report (pre-BSR) to a second IAB node of the wireless communication system using an extended Medium Access Control (MAC) Control Element (MAC CE) that communicates the outgoing LCG and a requested buffer size corresponding to the outgoing data flow.

2. The method of claim 1, wherein an incoming LCG of a first of the one or more incoming data flows, an incoming LCG of a second of the one or more incoming data flows, and the outgoing LCG are all different.

3. The method of claim 1, wherein the outgoing LCG is represented in the extended MAC CE using greater than 16 bits.

4. The method of claim 1, further comprising assigning the one or more incoming data flows to a sub-LCG for the outgoing LCG, and wherein the extended MAC CE further comprises an indication of the sub-LCG.

5. The method of claim 4, wherein a number of bits used for the indication of the sub-LCG in the extended MAC CE corresponds to the outgoing LCG.

6. The method of claim 4, wherein the sub-LCG is one of a number of sub-LCGs configured for use with the outgoing LCG by an integrated access and backhaul (IAB) control unit (CU).

7. The method of claim 1, wherein the extended MAC CE further includes a value for a number of the one or more incoming data flows.

8. The method of claim 1, wherein the extended MAC CE further includes a value for a number of unique LCGs among the one or more incoming data flows.

9. A method of an integrated access and backhaul (IAB) node of a wireless communication system, comprising:
assigning one or more incoming data flows received by the IAB node to an outgoing data flow having an outgoing logical channel group (LCG) and an outgoing priority index based on an incoming LCG of each of the one or more incoming data flows, wherein the outgoing LCG and the outgoing priority index together indicate a priority of the outgoing data flow, wherein the outgoing priority index comprises one or more of a prioritized bit rate (PBR) field and a bucket size duration (BSD) field; and sending a pre-emptive buffer status report (pre-BSR) to a second IAB node of the wireless communication system using an extended Medium Access Control (MAC) Control Element (MAC CE) that communicates the outgoing LCG, the outgoing priority index, and a requested buffer size corresponding to the outgoing data flow.

10. The method of claim 9, wherein the assignment of the one or more incoming data flows to the outgoing data flow is further based on an incoming priority index of each of the one or more incoming data flows.

11. The method of claim 9, wherein the outgoing priority index for the outgoing LCG is determined based on a packet delay budget (PDB) parameter received from an integrated access and backhaul (IAB) control unit (CU).

12. The method of claim 9, wherein the outgoing priority index further comprises a priority field.

13. The method of claim 9, wherein the outgoing priority index is chosen by the IAB node according to a configuration received from an integrated access and backhaul (IAB) control unit (CU).

14. A method of an IAB node of a wireless communication system, comprising:
determining that a condition corresponding to an incoming data flow of an incoming logical channel group (LCG) received from a child IAB node is above a threshold, wherein the condition is a number of data flows received at the child IAB node that is included in the incoming data flow, and the threshold is a maximum number of data flows received at the child IAB node that is included in the incoming data flow; and
providing, to the child IAB node, additional UL grants for the incoming LCG based on the determination that the condition is above the threshold.

15. The method of claim 14, wherein the threshold is configured at the IAB node by an integrated access and backhaul (IAB) control unit (CU).

16. The method of claim 14, wherein the child IAB node communicates a status of the condition to the IAB node.

* * * * *